P. JORGENSON.
GRAIN SEPARATOR.
APPLICATION FILED OCT. 16, 1916.

1,243,528.

Patented Oct. 16, 1917.
4 SHEETS—SHEET 1.

WITNESSES
F. C. Barry
W. E. Beck

INVENTOR
Peter Jorgenson
BY Munn & Co.
ATTORNEYS

P. JORGENSON.
GRAIN SEPARATOR.
APPLICATION FILED OCT. 16, 1916.

1,243,528.

Patented Oct. 16, 1917.
4 SHEETS—SHEET 2.

WITNESSES
H. C. Barry
W. E. Beck

INVENTOR
Peter Jorgenson
BY
ATTORNEYS

P. JORGENSON.
GRAIN SEPARATOR.
APPLICATION FILED OCT. 16, 1916.
1,243,528.
Patented Oct. 16, 1917.
4 SHEETS—SHEET 3.
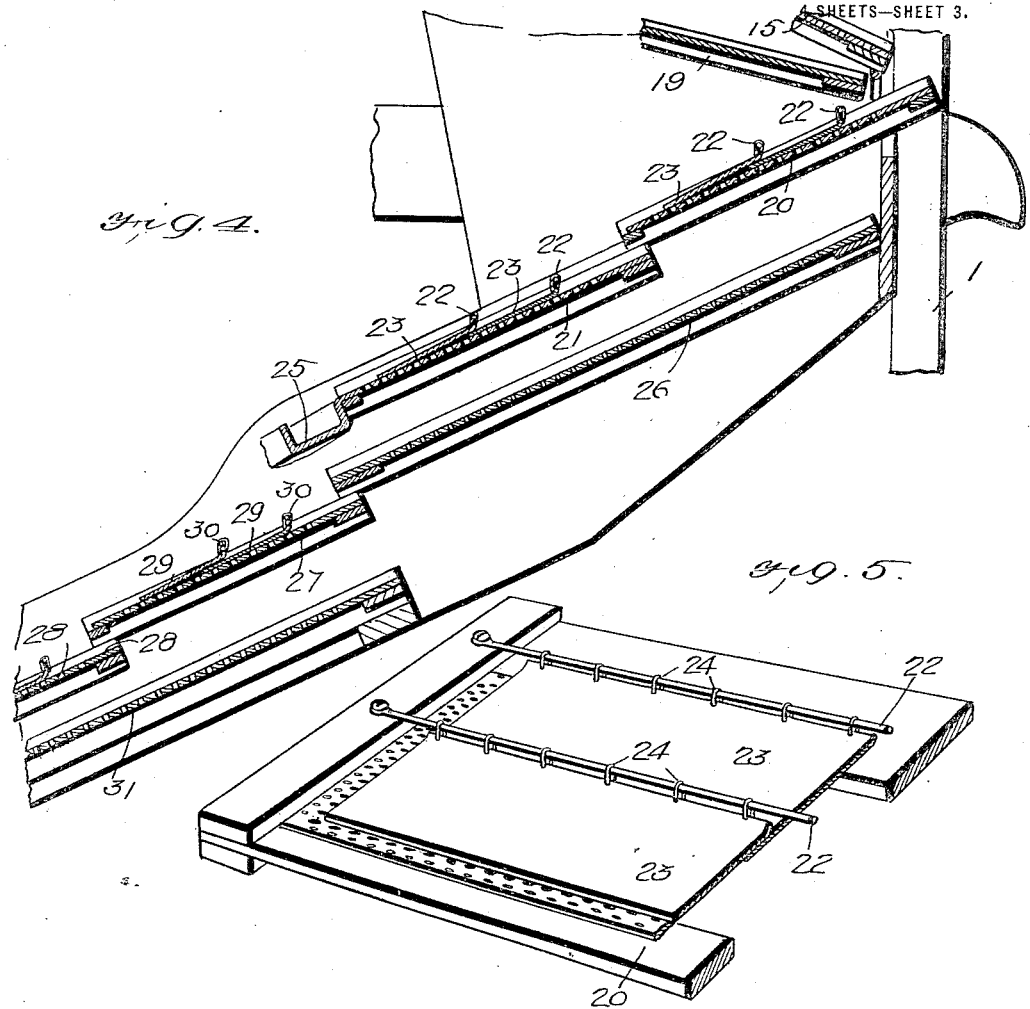
WITNESSES
H. C. Barry
W. E. Beck
INVENTOR
Peter Jorgenson
BY
ATTORNEYS

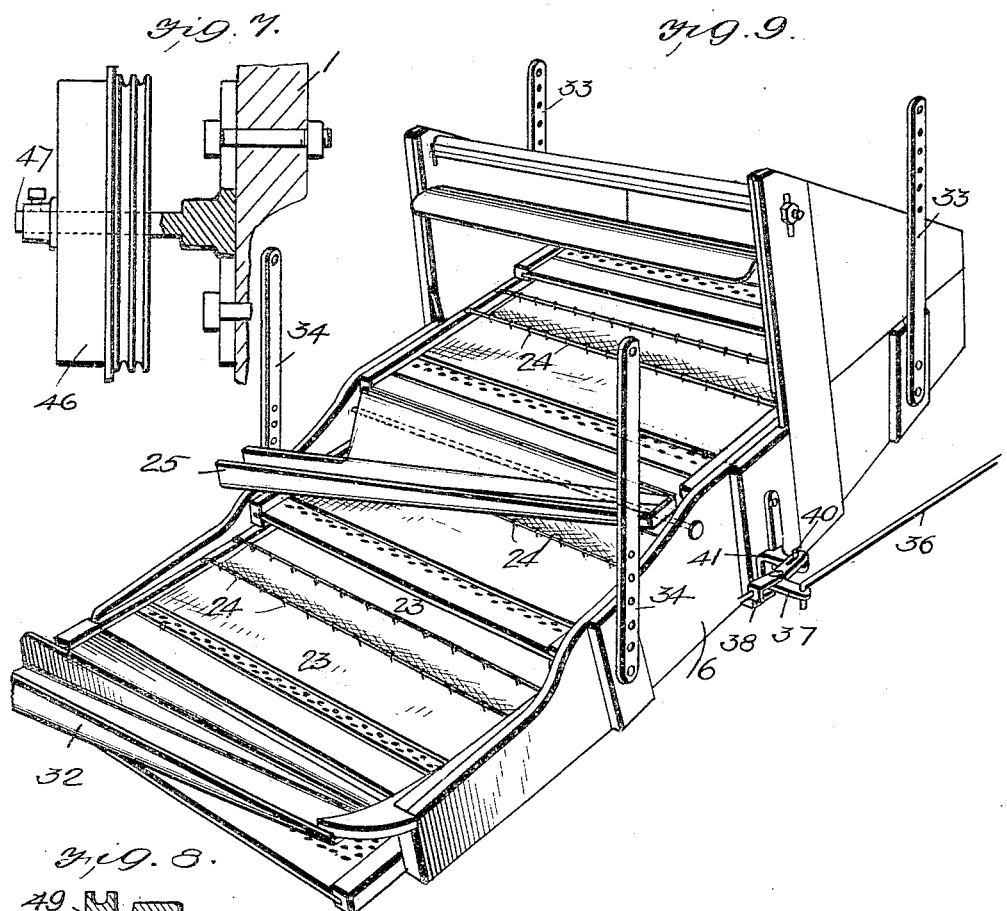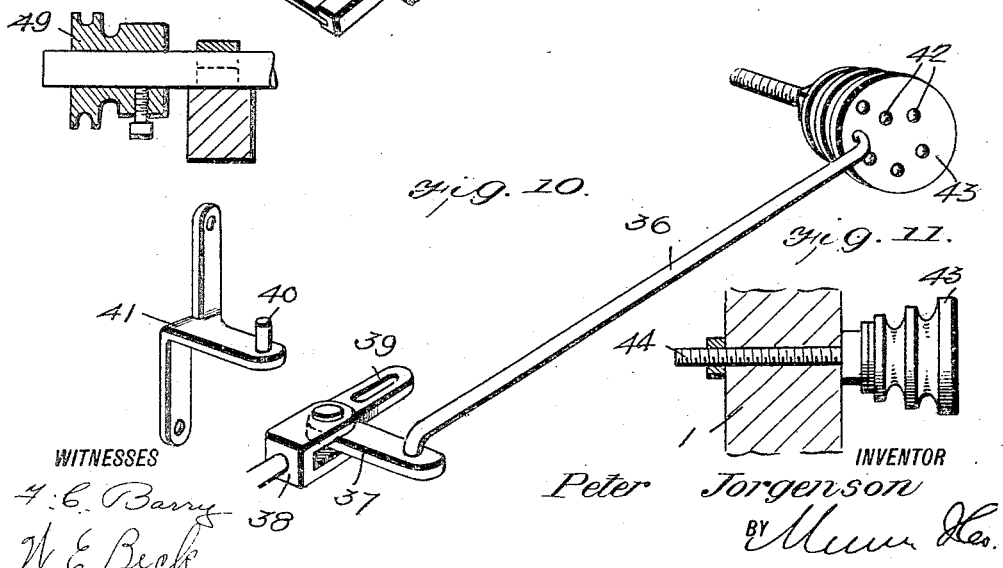

UNITED STATES PATENT OFFICE.

PETER JORGENSON, OF WATERTOWN, SOUTH DAKOTA.

GRAIN-SEPARATOR.

1,243,528. Specification of Letters Patent. Patented Oct. 16, 1917.

Application filed October 16, 1916. Serial No. 125,810.

*To all whom it may concern:*

Be it known that I, PETER JORGENSON, a citizen of the United States, and a resident of Watertown, in the county of Codington and State of South Dakota, have invented a certain new and useful Improvement in Grain-Separators, of which the following is a specification.

My invention is an improvement in grain separators, and has for its object to provide mechanism of the character specified especially adapted for thoroughly cleaning grain for seed and other market purposes, and for grading the grain and separating the cockle from the grain.

In the drawings:

Fig. 4 is an enlarged partial longitudinal section through the screen or sieve;

Fig. 5 is a perspective view of a portion of the sieve;

Fig. 6 is a perspective view of the regulating valve;

Figure 1:
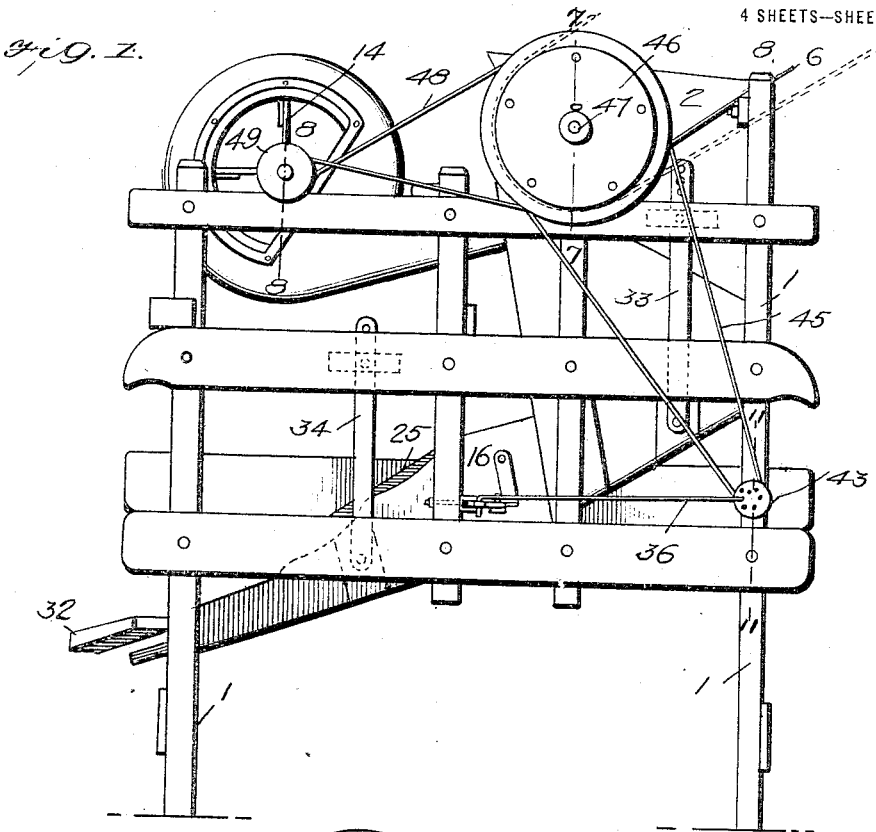
Figure 1 is a side view of the improved separator.
Figure 2:
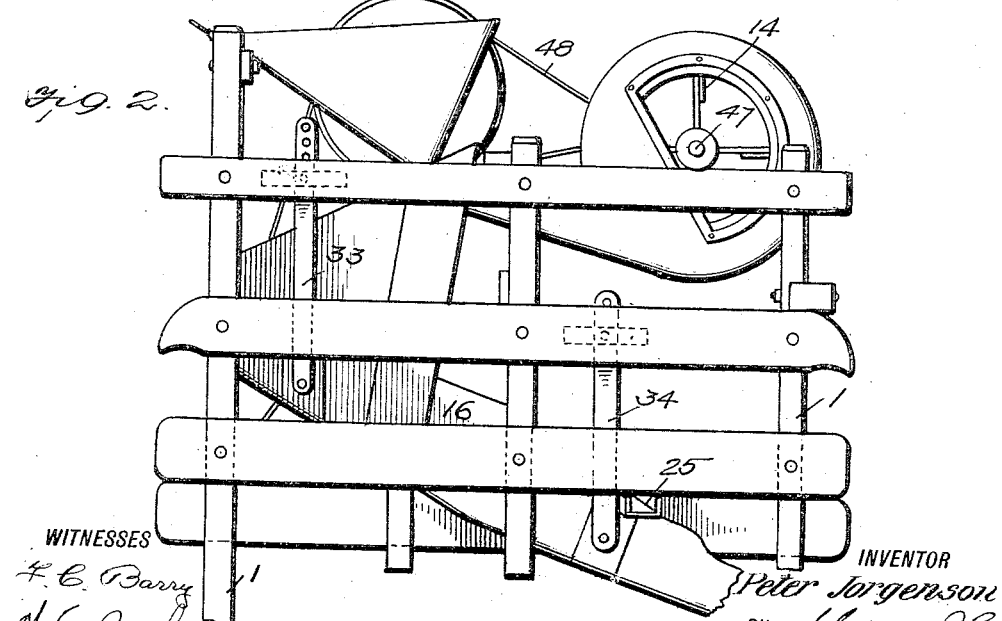
Fig. 2 is a similar view looking at the opposite side from Fig. 1.

Figs. 7, 8, and 11 are sections on the lines 7—7, 8—8, and 11—11 of Fig. 1;

Fig. 9 is a perspective view of the shoe and sieves, and

Fig. 10 is a perspective view of the shoe operating mechanism.

The present embodiment of the invention comprises a frame 1 of suitable size and arrangement, the said frame consisting of standards or uprights connected by suitable cross plates and beams, and a hopper 2 is arranged at the top of the frame at one end thereof.

This hopper has a discharge opening 3 in its base, and a valve 4 shown in detail in Fig. 6, is slidably mounted on the bottom of the hopper for varying the size of the opening, the valve being movable over the opening for this purpose. The valve is shown as T-shaped, having a stem 5 to which is rotatably connected the inner end of a threaded rod 6. This rod passes through the vertical portion of an angle bracket 7 secured to the hopper bottom at the outer side thereof, and a nut 8, threaded onto the rod is secured to the bracket. It will be evident that, by turning the nut 8 in the proper direction, the extent of the discharge opening of the bottom of the hopper may be varied.

A screen 9 of perforate material, as for instance, wire cloth, is arranged transversely of the hopper near the top thereof, the said screen being hinged as indicated at 10 to the bottom of the hopper adjacent to the bracket 7 before mentioned. Because of this arrangement, the screen may swing out to open up the hopper, as indicated in dotted lines in Fig. 3, thus permitting access to the hopper when desired for any purpose.

Figure 3:
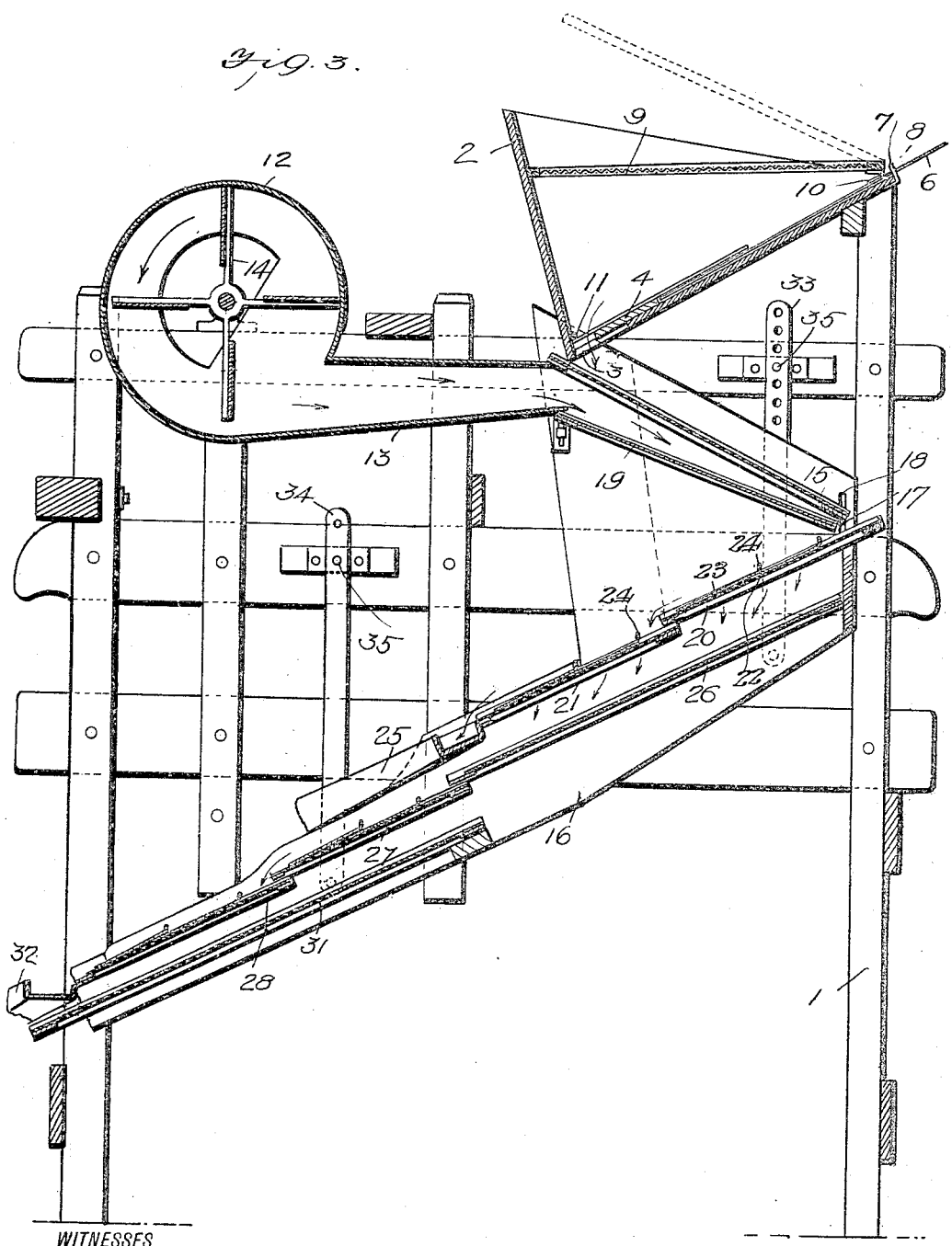
Fig. 3 is a longitudinal section.

The sieve or screen 9 is a coarse sieve, and the said sieve will retain all the unthreshed wheat heads, straw, weeds, and cockle burs, thereby permitting the machine to feed more evenly and the screen may be emptied by tipping, as indicated in dotted lines in Fig. 3, to cause the material held thereon to discharge outside of the machine.

A rod 11 is arranged transversely of the bottom of the hopper at the feed opening and above the same, and this rod is connected with a shaking shoe to be presently described and moves with the shoe to prevent clogging of the feed opening. A fan casing 12 is arranged at the opposite end of the machine from the hopper, and a discharge chute 13 of the fan delivers just below the feed opening, so that the grain passing through the opening will be subjected to a current of air from the fan 14 mounted within the casing 12.

A screen or sieve 15 is mounted in inclined position below the hopper, the said screen having its upper end placed at the upper end of the discharge chute 13 of the fan, and from the chute the screen inclines downwardly and outwardly. This screen is mounted in the shaking shoe, indicated generally at 16, and the lower end of the screen is supported by a rod 17 arranged transversely of the shoe, the ends of the rod being mounted in vertical slots 18 in the shoe. The ends of the rod are provided with nuts outside of the shoe, and it will be obvious that by tightening these nuts the lower end of the screen may be held in adjusted position to vary the inclination of the screen.

An inclined feed plate 19 is arranged directly below the screen 15. The upper end of the feed plate 19 is arranged directly below the lower side of the discharge chute 13 of the fan, and the lower end of the plate is above a series of screens to be described, the said screens inclining downwardly away from the plate. The grain falling through the screen 15 falls upon the plate 19 and is delivered to the series of screens before mentioned.

Six screens are mounted on the shaking shoe below the screen 15 and the plate 19. The screen 20, which is adjacent to the feed plate 19, comprises an open rectangular frame secured to the shoe and within the frame is secured a sheet of galvanized metal, for instance, sheet iron or zinc, provided with circular openings as shown, the said openings being of a uniform and definite size. The frame is inclined as shown, and the screen delivers to a second screen 21 similar in all respects to the screen 20 and having its upper end directly below the lower end of the screen 20. Above each of these screens rods 22 are arranged transversely, and suspended from each rod is a sheet 23 of flexible material, as for instance, rubber. Each sheet has loops or eyes 24 for engaging the rod, and the lower cloth of each screen overlaps the uppermost cloth of the said screen. The sheets 23 have an aggregate width approximately equal to the width of the screens, and the object of the cloths is to keep the grain and cockle from rolling and jumping over the screens, and force the said grain and cockle to move slowly over the screen, forcing the cockle through the screen while the grain passes over the same. Furthermore, since cockle has a rough surface, it is held back to some extent by the rubber cloths, and because of the fact that the cloths are loosely mounted on the rods and may move with respect to the screens, the cloths tend to force the cockle through the screen, while the grain, having smooth surfaces, will slide along between the cloth and the screen. The sheets 23 are of lesser width than the screen, as shown, so that a limited motion may be permitted between the said cloths and the screen.

Immediately below the lower edge of the screen 21 is a discharge trough 25 which inclines downwardly and laterally with respect to the screen, delivering outside of the machine. This discharge trough carries away the large size grain which passes over the screens 20 and 21, the said grain being clean and of first grade. All cockle and grain which pass through the screens 20 and 21 fall upon a screen 26 which is mounted below the said screens 20 and 21 and has a width approximately equal to the aggregate width of the screens 20 and 21. The screen 26 also has the same inclination as the screens 20 and 21, and the said screen 26 delivers to a pair of screens 27 and 28 similar to the screens 20 and 21 and similarly arranged. These screens 27 and 28 have rubber cloths which are mounted on rods 30 in the same manner as the cloths 23 are mounted on the rods 22.

A second screen 31 similar to the screen 26 is arranged below the screens 27 and 28, and all of the screens 20, 21, 26, 27, 28, and 31 are similar, being formed from sheet metal and having circular perforations. The screens 20, 21, 27, and 28 have openings of the same size. The openings in the screen 31 are somewhat larger than those in the screen 26, being somewhat smaller than those in the screens 20, 21, 27, and 28. The openings of the screen 26 are smaller than those of the screens 20 and 21.

A delivering trough 32 is arranged below the lower end of the screen 28 and the said screen delivers to this trough, which in turn delivers laterally from the machine, the second grade grain. All of the impurities and the smallest grain will fall through the screens 26 and 31 between the machine, said material being designated as screenings. That grain which passes over the screen 31 will be delivered as third grade grain. Thus the machine will deliver three grades of grain, the first from the screens 20, 21; the second from the screens 27, 28, and the third from the screen 31.

The frame of each screen is of hard wood secured within the shoe 16, and this shoe is suspended by links 33 and 34 respectively, the links 33 being secured at their lower ends to the shoe, while the links 34 are pivoted to the shoe at their lower ends. The upper end of each link 33 is provided with a series of openings, and the lower end of each link 34 is provided with a similar series. By means of these openings the height of the shoe in the frame may be adjusted. The upper ends of the links are pivoted to the frame as indicated at 35 and the shoe is swung by the mechanism shown more particularly in Fig. 10 and comprising a pitman 36 connected at one end to an elbow lever 37 in a bracket 38 on the frame. The pitman is connected with one arm of the elbow and the other arm of the elbow has a slot 39 for receiving a pin 40 on the bracket 41 secured to the shoe. The other end of the pitman has an angular lug for engaging one of a series of openings 42 in a pulley 43 journaled on the frame. These openings are arranged at different distances from the center of the pulley, and it will be obvious that by engaging the pitman with different openings, the speed and extent of the shaking of the shoe may be varied. This pulley 43 has two grooves as shown, and is journaled on a screw 44 which is passed through the frame 1 and is engaged by a nut to hold the pulley in proper position.

The pulley 43 is a cone pulley, so that the grooves are of an unequal radius and either may be engaged by a belt 45 which connects the pulley with a pulley 46 also journaled on the frame at the hopper. The pulley 46 has an extension provided with two grooves, one of the said grooves being engaged by the belt 45, while the other is engaged by a belt 48 which connects the pulley 46 with a pulley 49 on the fan shaft. The pulley 46 is engaged by a belt from a suitable source of power for driving the machine.

In operation the grain to be screened is fed into the hopper, and any rough stuff that may be in the grain will be caught by the screen 9, such for instance, as straw, unthreshed heads, and the like, and this coarse stuff may be discharged by tilting up the screen. The grain is fed through the discharge opening 3 of the hopper onto the screen 15 where it meets with a current of air from the fan which cleans the same. The grain is fed then onto the feed plate 19 and passes onto the screens 20 and 21. The first grade grain is delivered through the discharge trough 25 and the remaining grain passes from the screen 26 onto the screens 27 and 28, from which the second grade grain is delivered by the trough 32. That grain which passes through the screens 27 and 28 onto the screen 31 and which does not pass through the screen 31, is delivered as third grade grain. The shoe is shaken during the passage of the grain over the screens supported thereby, and the rubber cloths act to thoroughly separate all trash from the grain and to clean the grain.

I claim:—

1. In a separator, an inclined screen, means for imparting a lateral vibratory movement to the screen, presser sheets resting upon the screen, and means connecting the presser sheets at their upper edges with the screen to admit of independent lateral movement between the presser sheets and screen.

2. In a separator, a screen, a plurality of transverse rods mounted upon the screen at intervals in its length, and spaced vertically therefrom, presser sheets of a less width than the screen resting thereon, and loops at the upper edges of the presser sheets engaging the said rods loosely to admit of relative independent lateral play between the screen and presser sheets.

PETER JORGENSON.

Witnesses:
WILLIAM G. GESLEY,
S. F. SLOANE.

Copies of this patent may be obtained for five cents each, by addressing the "Commissioner of Patents, Washington, D. C."